(12) United States Patent
Yang

(10) Patent No.: US 8,267,111 B2
(45) Date of Patent: Sep. 18, 2012

(54) PRESSURE BALANCE VALVE

(75) Inventor: Chaota Yang, Taichung (TW)

(73) Assignee: Globe Union Industrial Corp., Taichung (TW)

( * ) Notice: Subject to any disclaimer, the term of this patent is extended or adjusted under 35 U.S.C. 154(b) by 320 days.

(21) Appl. No.: 12/716,511

(22) Filed: Mar. 3, 2010

(65) Prior Publication Data

US 2011/0214752 A1   Sep. 8, 2011

(51) Int. Cl.
*G05D 11/00* (2006.01)
(52) U.S. Cl. .......... 137/100; 137/7; 137/625.41; 137/98
(58) Field of Classification Search .............. 137/100, 137/98, 99, 7, 625.41, 625.46
See application file for complete search history.

(56) References Cited

U.S. PATENT DOCUMENTS

| | | | | | |
|---|---|---|---|---|---|
| 2,090,843 | A | * | 8/1937 | King | 137/98 |
| 4,926,897 | A | * | 5/1990 | Perrott | 137/98 |
| 5,299,593 | A | * | 4/1994 | Ottelli | 137/100 |
| 5,839,471 | A | * | 11/1998 | Yang | 137/625.18 |
| 5,884,653 | A | * | 3/1999 | Orlandi | 137/100 |
| 5,983,918 | A | * | 11/1999 | Chang | 137/98 |
| 6,138,705 | A | * | 10/2000 | Chen | 137/98 |
| 6,176,250 | B1 | * | 1/2001 | Lin et al. | 137/98 |
| 6,267,134 | B1 | * | 7/2001 | Chen | 137/98 |
| 6,412,513 | B1 | * | 7/2002 | Yang | 137/100 |
| 6,446,655 | B1 | * | 9/2002 | Chang | 137/100 |
| 7,028,702 | B2 | * | 4/2006 | Park et al. | 137/98 |
| 7,918,241 | B1 | * | 4/2011 | Chang | 137/98 |

* cited by examiner

*Primary Examiner* — Eric Keasel
*Assistant Examiner* — Minh Le

(57) ABSTRACT

A temperature controlling valve includes a housing and a valve core installed in the valve core, the housing including a fist end wall having a first limiting elements and a second end wall having a second limiting element, and the first and the second limiting elements being fixed to fourth openings on two ends of the valve core to decrease cross sectional areas of the fourth openings for flowing the cold and the hot waters to be less than cross sectional areas of first and second inlets to flow the cold and the hot waters of the housing, such that a pressure in the valve core is gathered well to sense a pressure difference between the cold and the hot waters precisely and balance the pressure difference.

6 Claims, 12 Drawing Sheets

| A1 | A2 | A3 | A4 | A1/A4 | L | P1 | P2 |
|---|---|---|---|---|---|---|---|
| 35.66 | 83.76 | 95.02 | 50.26 | 1/1.40 | 7 | 22 | 22 |
| 35.66 | 83.76 | 95.02 | 44.17 | 1/1.23 | 6.9 | 22 | 22 |
| 35.66 | 83.76 | 95.02 | 38.48 | 1/1.07 | 6.8 | 22 | 22 |
| 35.66 | 83.76 | 95.02 | 33.18 | 1.07 | 6.8 | 22 | 22 |
| 35.66 | 83.76 | 95.02 | 28.27 | 1.26 | 6.8 | 23 | 23 |
| 35.66 | 83.76 | 95.02 | 23.75 | 1.50 | 6.7 | 24 | 24 |
| 35.66 | 83.76 | 95.02 | 19.63 | 1.81 | 6.6 | 25 | 25 |
| 35.66 | 83.76 | 95.02 | 15.9 | 2.24 | 5.6 | 29 | 29 |
| 35.66 | 83.76 | 95.02 | 12.56 | 2.83 | 5.3 | 30 | 30 |
| 35.66 | 83.76 | 95.02 | 9.62 | 3.70 | 4.9 | 31 | 31 |

FIG.13

| Brand | A1 | A2 | A3 | A4 | A2/A4 |
|---|---|---|---|---|---|
| 1 | 62.9 | 28.39 | 43 | 25.79 | 1.10 |
| 2 | 47.85 | 35.66 | 93.3 | 34.84 | 1.02 |

FIG.14

PRESSURE BALANCE VALVE

BACKGROUND OF THE INVENTION

1. Field of the Invention

The present invention relates to a pressure balance valve that is used to adjust a pressure between cold and hot waters automatically to balance a pressure difference.

2. Description of the Prior Art

Conventional digital showering system includes an outlet device having a temperature controlling valve and a temperature sensing element, the temperature controlling valve is used to set a desired temperature and to cooperate with the temperature sensing element to adjust a rate for mixing cold and hot waters so that the desired temperature of the mixed cold and hot water is obtained.

Conventional temperature controlling valve serves to control an inflow amount and a mix rate of the cold and the hot waters by adjusting cross sectional areas of the pores to flow the cold and the hot waters individually so as to further control a temperature of the mixed cold and hot water, but when the pressures of the cold and the hot waters flowing through the pores are not equal, the temperature can not be controlled exactly, therefore a pressure balance valve is installed to an inlet end of the temperature control valve of the outlet device to adjust water pressures of the cold and the hot waters, keeping the pressure balanced between the cold and the hot waters in the temperature controlling valve.

Conventional pressure balance valve includes a housing, a valve core installed to the housing, the valve core includes a cold-water pressure room and a hot-water pressure room, both of which are spaced by a sensing wall, and the sensing wall includes a first surface to sense cold water and a second surface to sense hot water so that the pressures of the cold-water and the hot-water pressure rooms influence the first and the second surfaces respectively, such that when a difference between the pressures of the cold and the hot waters are sensed, the valve core slides axially so that a pressure between the cold water in the cold-water room and the hot water in the hot-water room keeps balanced, thereby controlling the temperature of the mixed cold and hot water accurately.

Furthermore, many countries establish strict standard to limit an error valve of the water flowing temperature of the outlet device, such as within positive and negative 2 degrees Celsius, but most outlet devices in the market still can not be in compliance with this standard.

The present invention has arisen to mitigate and/or obviate the afore-described disadvantages.

SUMMARY OF THE INVENTION

The primary object of the present invention is to provide a pressure balance valve that is capable of overcoming the shortcomings of the conventional temperature controlling valve.

Another object of the present invention is to provide a pressure balance valve that when a pressure difference between the cold-water and the hot-water pressure rooms is generated, the valve core adjusts flowing amount of the cold and the hot waters to eliminate the difference, thereby balancing water pressure.

A pressure balance valve in accordance with a preferred embodiment of the present invention comprises:

a housing including a first peripheral wall, a first end wall, and a second end wall to define an internal chamber; the first peripheral wall including a cylinder cavity defined therein to form most part of the internal chamber, and the cavity including two annular first openings arranged on two ends thereof respectively; the first peripheral wall including a first inlet to flow cold water and a second inlet to flow hot water, both of which are in communication with the cavity so that the cold and the hot waters from the first and the second inlets respectively flow into the cavity, and including a first outlet to flow the cold water and a second outlet to flow the hot water, both of which communicate with the cavity so that the cold and the hot waters from the cavity flow out of the first and the second outlets individually; the first and the second end walls including a first and a second limiting elements to limit flowing amount disposed on inner surfaces thereof respectively;

a valve core including a first loop, a second loop, and a pressure sensing cliff between the first and the second loops; the valve core including a cold-water pressure room defined between one side of the pressure sensing cliff and the first loop, and including a hot-water pressure room defined between another side of the pressure sensing cliff and the second loop; the valve core being slidably fitted to the cavity to slide axially; the valve core including at least one first pore to flow the cold water defined between the first loop and the pressure sensing cliff so as to communicate with the cold-water pressure room and the first inlet, and including at least one second pore to flow the hot water defined between the second loop and the pressure sensing cliff so as to communicate with the hot-water pressure room and the second inlet; the cavity including two annular first openings arranged on two ends thereof and defined by the first and the second loops respectively, and the first and the second limiting elements being placed in the first openings of the first and the second loops so that cross sectional areas of the first openings to flow the cold and the hot waters are decreased to be less than those of the first and the second inlets.

A pressure balance valve in accordance with another preferred embodiment of the present invention comprises:

a housing including a first peripheral wall, a first end wall, and a second end wall to define an internal chamber; the first peripheral wall including a cylinder cavity defined therein to form most part of the internal chamber; the first peripheral wall including a first inlet to flow cold water and a second inlet to flow hot water, both of which are in communication with the cavity so that the cold and the hot waters from the first and the second inlets respectively flow into the cavity, and including a first outlet to flow the cold water and a second outlet to flow the hot water, both of which communicate with the cavity so that the cold and the hot waters from the cavity flow out of the first and the second outlets individually;

a valve core including a first loop, a second loop, and a pressure sensing cliff between the first and the second loops; the valve core including a cold-water pressure room defined between one side of the pressure sensing cliff and the first loop, and including a hot-water pressure room defined between another side of the pressure sensing cliff and the second loop; the valve core being slidably fitted to the cavity to slide axially; the valve core including at least one first pore to flow the cold water defined between the first loop and the pressure sensing cliff so as to communicate with the cold-water pressure room and the first inlet, and including at least one second pore to flow the hot water defined between the second loop and the pressure sensing cliff so as to communicate with the hot-water pressure room and the second inlet;

the cavity including two annular first openings arranged on two ends thereof and defined by the first and the second loops respectively to flow the cold and the hot waters toward the first and the second outlets; wherein a ratio of cross sectional areas of the first openings of the cavity and a cross sectional area of the first outlet is at least larger than 1.26; a ratio of the cross sectional areas of the first openings of the cavity and a cross sectional area of the second outlet is at least larger than 1.26; and a sum of outflow amounts of the first and the second outlets is larger than a basic flowing amount.

BRIEF DESCRIPTION OF THE DRAWINGS

FIG. 13 shows pressure gathering effects of a cold-water pressure room and a hot-water pressure room, wherein inflow pressure of the cold and the hot waters are set under a condition of 45 Psi;

FIG. 14 shows pressure balance valves of two different brands, including cross sectional areas of the first hole, the first orifice, the fourth opening, the first outlet, and the second outlet, sums of the cross sectional areas of the second holes and the second orifices, a ratio of the cross sectional areas of the first hole and the first outlet, and a ratio of the cross sectional areas of the first orifice and the second outlet.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

With reference to FIGS. 1-5, a pressure balance valve 1 according to a preferred embodiment of the present invention is installed to an outlet device of a showering system, cooperates with a temperature controlling valve to adjust a water temperature, and comprises a housing 10 and a valve core 20.

Figure 6:
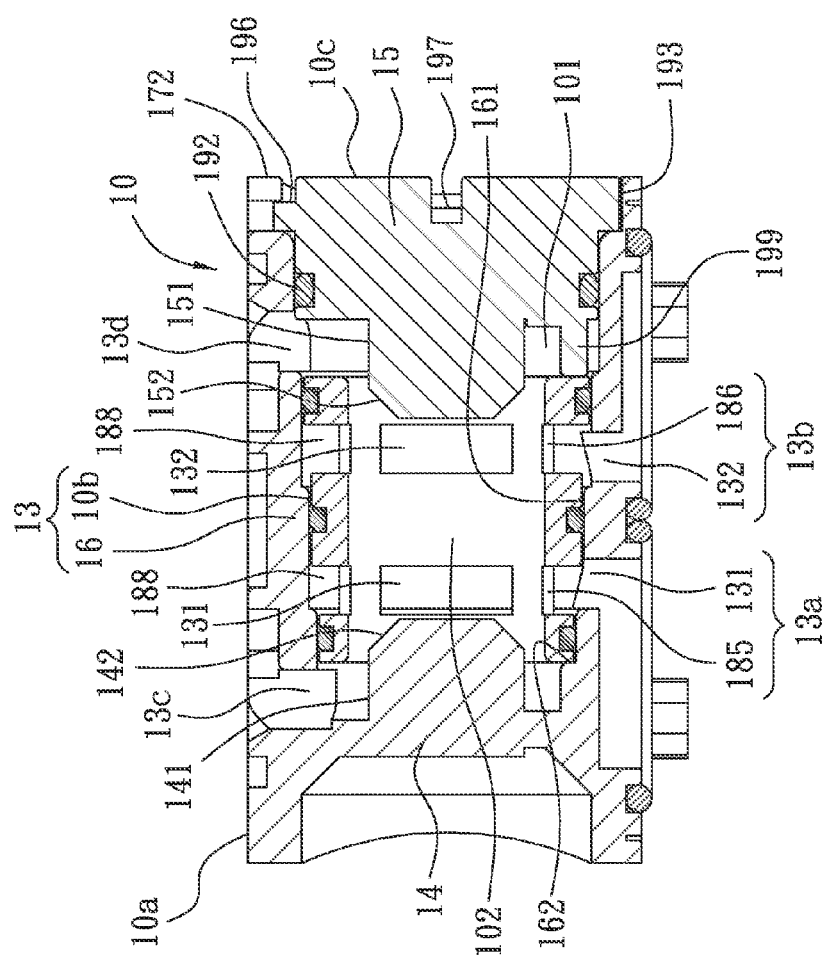
FIG. 6 is a cross sectional view showing the assembly of a housing of the pressure balance valve according to the preferred embodiment of the present invention.

The housing 10, as shown in FIG. 6, is formed in a circular column shape, and includes a circular top surface 11 and a circular bottom surface 12, and includes a first peripheral wall 13, a first end wall 14, and a second end wall 15 to define an internal chamber 101. The first peripheral wall 13 includes a cylinder cavity 102 defined therein to form most part of the internal chamber 101, and the cavity 102 includes two annular first openings arranged on two ends thereof respectively. The first peripheral wall 13 includes a first inlet 13a to flow cold water and a second inlet 13b to flow hot water, both of which are in communication with the cavity 102 so that the cold and the hot waters from the first and the second inlets 13a, 13b respectively flow into the cavity 102, and includes a first outlet 13c to flow the cold water and a second outlet 13d to flow the hot water, both of which communicate with the cavity 102 so that the cold and the hot waters from the cavity 102 flow out of the first and the second outlets 13c, 13d individually. The first and the second end walls 14, 15 include a first and a second limiting elements 141, 151 to limit flowing amount disposed on inner surfaces thereof respectively.

The first and the second limiting elements 141, 151 are designed in an annular column shape, and include conical surfaces 142, 152 mounted on distal ends thereof individually to guide water.

Figure 5:
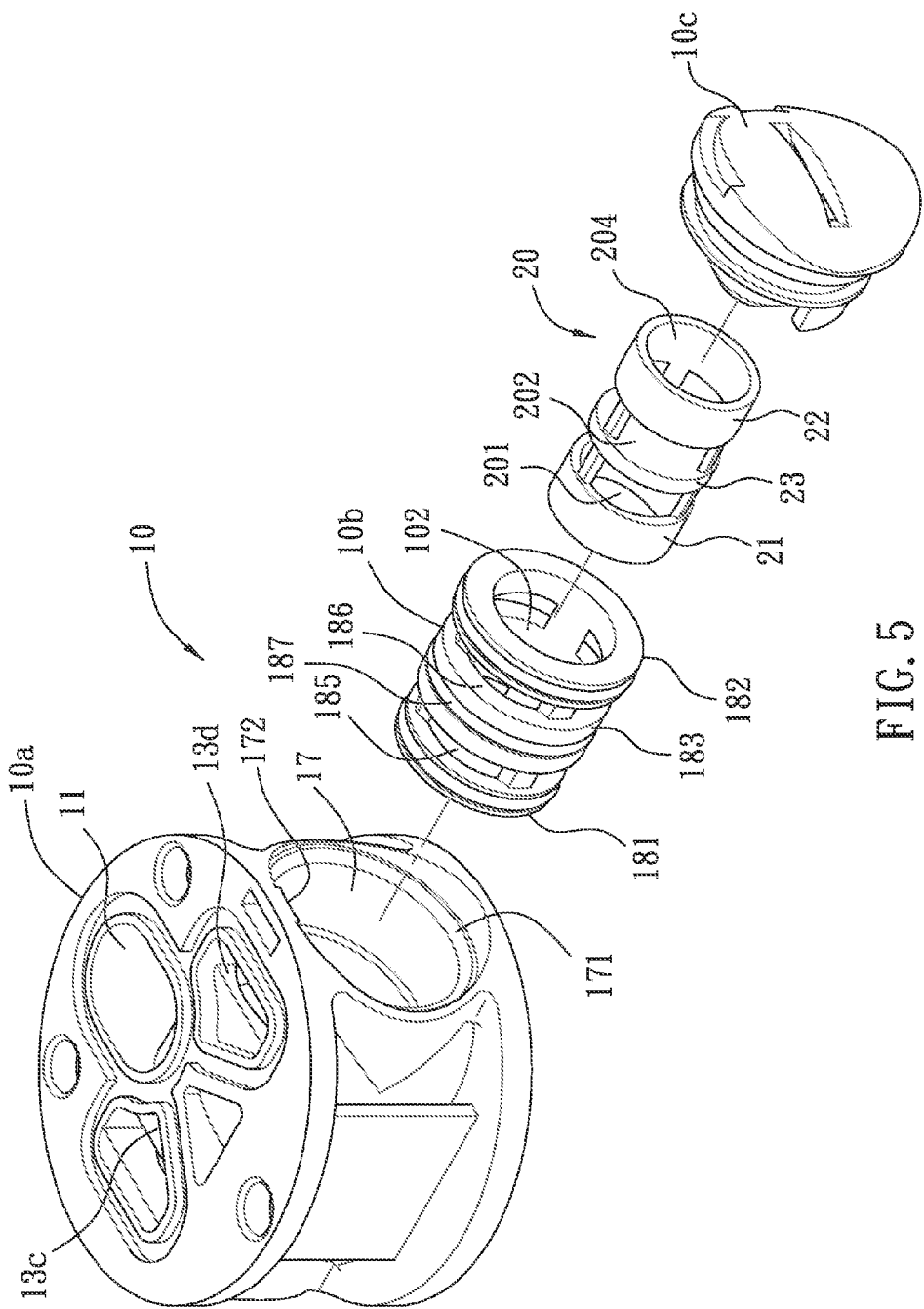
FIG. 5 is a perspective view showing the exploded components of the pressure balance valve according to the preferred embodiment of the present invention.

With reference to FIGS. 5 and 6, the housing 10 is comprised of a body 10a, a sleeve member 10b, and a plug element 10c.

The body 10a includes the circular top surface 11, the circular bottom surface 12, the first end wall 14, and the first limiting element 141, and further includes a second peripheral wall 16 integrally connecting with the circular top surface 11, the circular bottom surface 12, and the first end wall 14 to form a part of the first peripheral wall 13.

An inner surface 161 of the second peripheral wall 16 includes two second openings fixed thereon relative to the circular bottom surface 12 to define a first hole 131 to flow the cold water and a first orifice 132 to flow the hot water, and the first hole 131 is used to form a part of the first inlet 13a, and the first orifice 132 serves to form a part of the second inlet 13b. The inner surface 161 also includes two third openings attached thereon in relation to the circular top surface 11 to form the first outlet 13c and the second outlet 13d individually, and includes a first stepped rim 162 formed thereon relative to the first end wall 14.

The first peripheral wall 13 includes a bore 17 disposed thereon relative to the first end wall 14 as shown in FIG. 5, and the bore 17 includes a second stepped rim 171 mounted thereon and a stop tab 172 fixed on a top end thereof.

The body 10a includes a first channel 111 to flow mixed cold and hot water arranged between the circular top surface 11 and the circular bottom surface 12 so as to flow the mixed cold and hot water from the temperature controlling valve.

Figure 1:
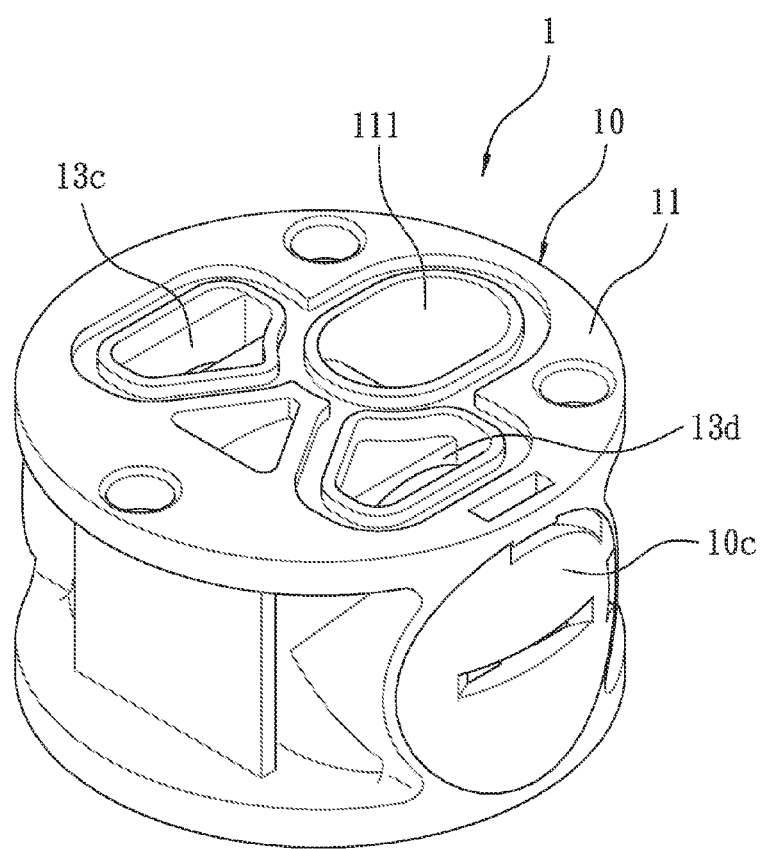
FIG. 1 is a perspective view showing the assembly of a pressure balance valve according to a preferred embodiment of the present invention.
Figure 2:
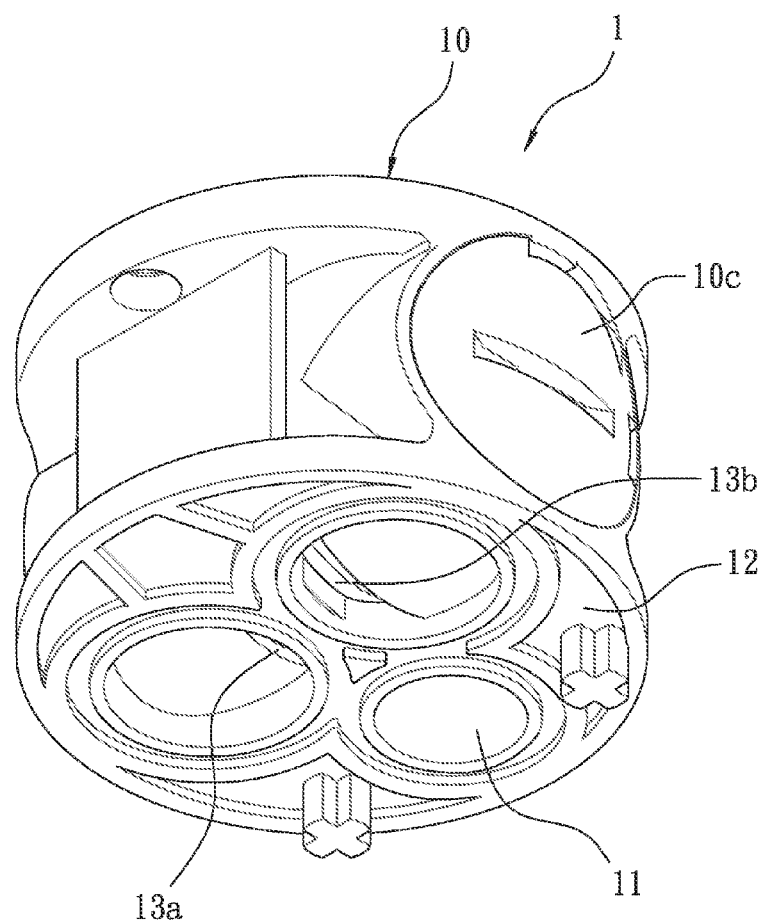
FIG. 2 is another perspective view showing the assembly of the pressure balance valve according to the preferred embodiment of the present invention.
Figure 3:
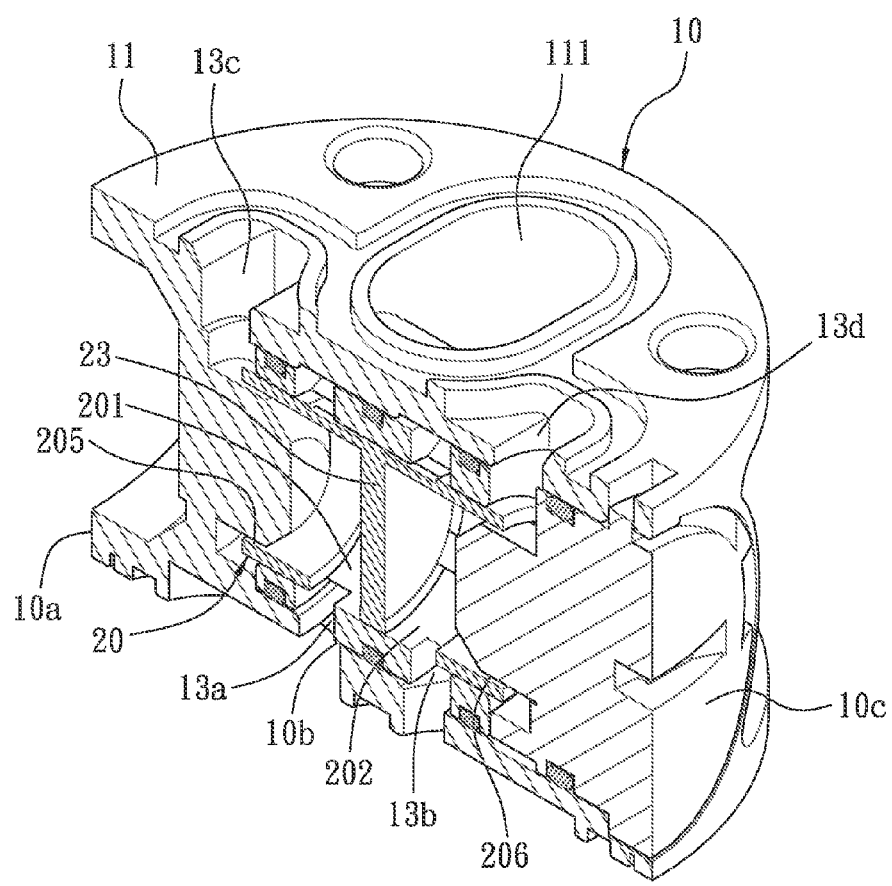
FIG. 3 is a perspective view showing the cross sectional of the assembly of the pressure balance valve according to the preferred embodiment of the present invention.
Figure 4:
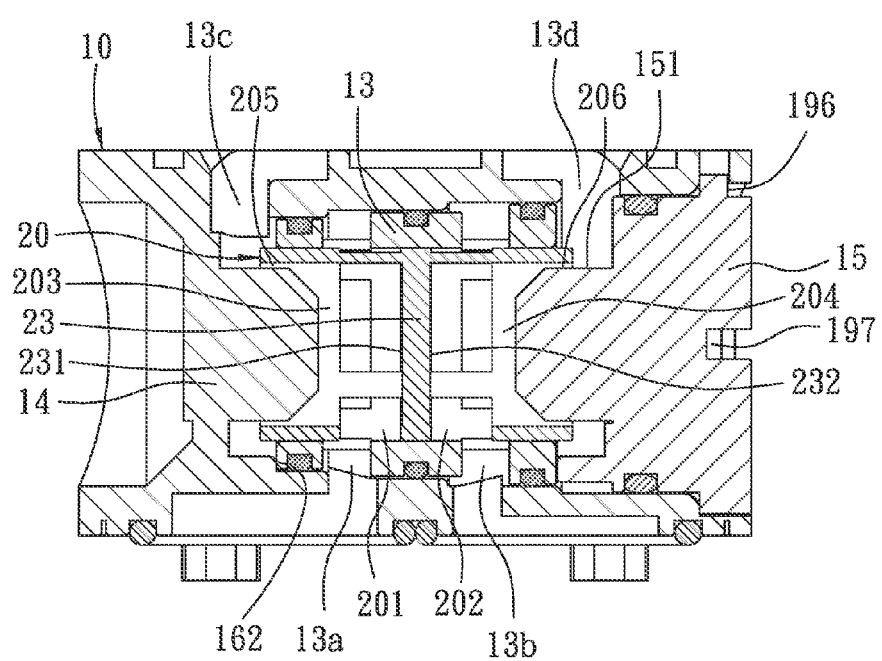
FIG. 4 is a cross sectional view showing the assembly of the pressure balance valve according to the preferred embodiment of the present invention.
Figure 7:
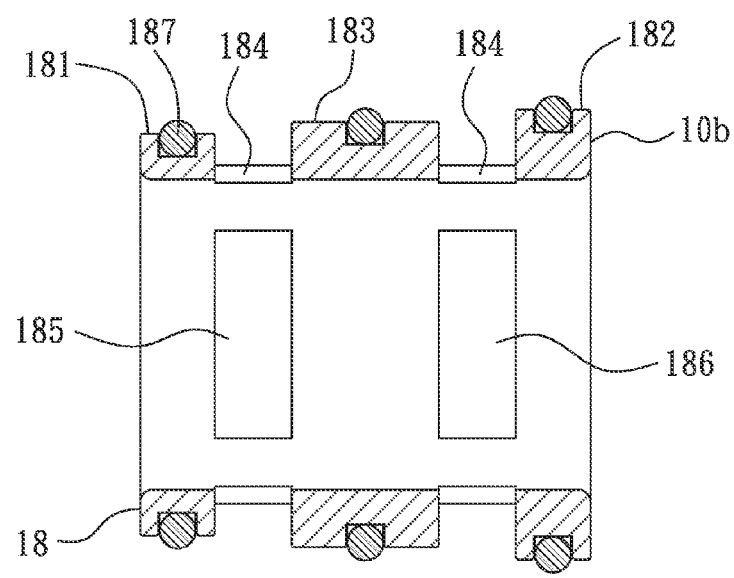
FIG. 7 is a cross sectional view showing the assembly of a sleeve member of the pressure balance valve according to the preferred embodiment of the present invention.

The sleeve member 10b, as illustrated in FIGS. 4, 5, and 7 is placed into the second peripheral wall 16 of the body 10a through the bore 17, and includes a first fence 181 and a second fence 182 attached on two ends thereof individually, and includes a middle fence 183 between the first and the second fences 181, 182, between the first fence 181 and the middle fence 183 and between the middle fence 183 and the second fence 182 are arranged a plurality of connecting ribs 184 which are spaced apart from each other, such that between the first fence 181, the second fence 182, and the middle fence 183 are defined a number of second holes 185 to flow the cold water and a plurality of second orifices 186 to flow the hot water.

The sleeve member 10b allows to define the cavity 102 by using the first fence 181, the second fence 182, the middle fence 183, and the connecting ribs 184.

The first fence 181 of the sleeve member 10b engages with the first stepped rim 162 of the second peripheral wall 16 so that the sleeve member 10b is retained exactly, and the second holes 185 are in communication with the first hole 131 to define the first inlet 13a as shown in FIG. 6. The second orifices 186 communicate with the first orifice 132 to define the second inlet 13b.

Each of the first fence 181, the second fence 182, and the middle fence 183 includes a first seal ring 187 retained thereon to engage with the inner surface 161 of the second peripheral wall 16, and a diameter of an outer surface of the connecting rib 184 is less than that of an outer rim of each of the first fence 181, the second fence 182, and the middle fence 183, accordingly between the outer surface of the connecting rib 184 and the inner surface 161 of the second peripheral wall 16 is defined a gap 188 so that a partial water from the first hole 131 flows through the gap 188, and then flows into the cavity 102 via the second holes 185. Likewise, a partial water from the first orifice 132 flows through the gap 188, and then flows into the cavity 102 via the second orifices 186.

Figure 8:
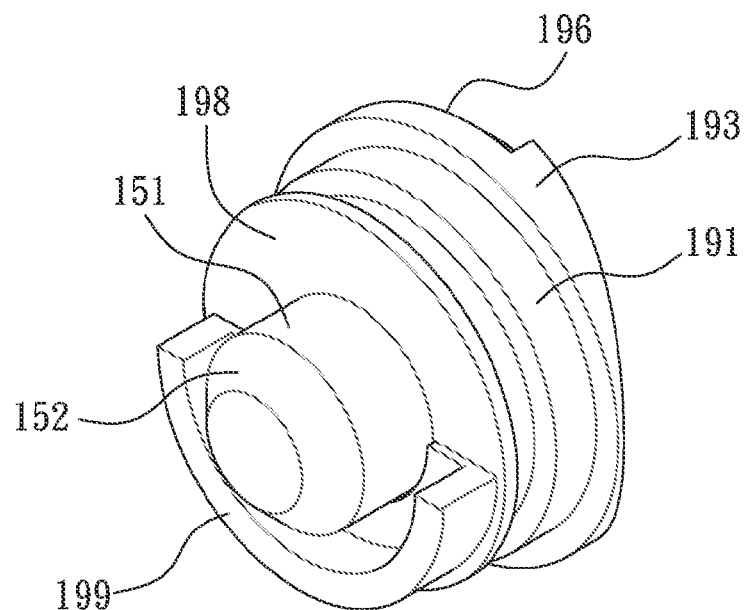
FIG. 8 is a perspective view showing the assembly of a plug element of the pressure balance valve according to the preferred embodiment of the present invention.
Figure 9:
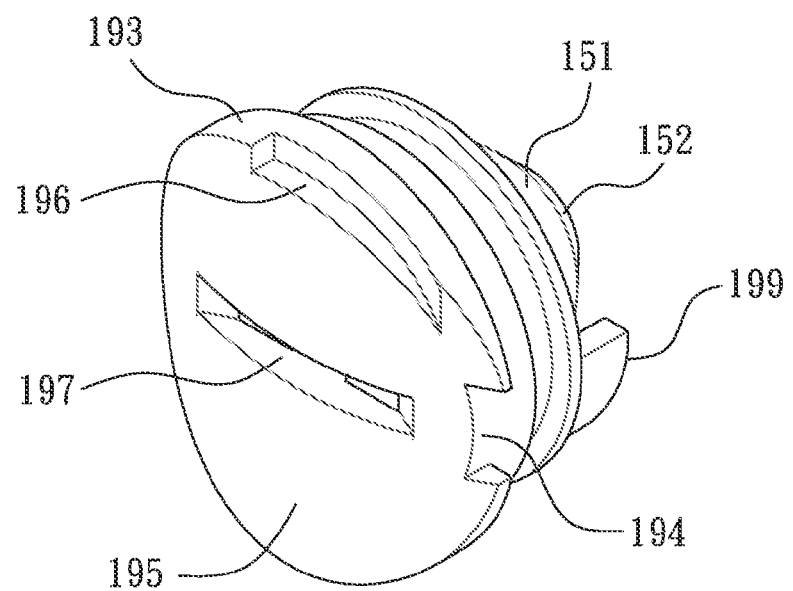
FIG. 9 is another perspective view showing the assembly of a plug element of the pressure balance valve according to the preferred embodiment of the present invention.
Figure 10:
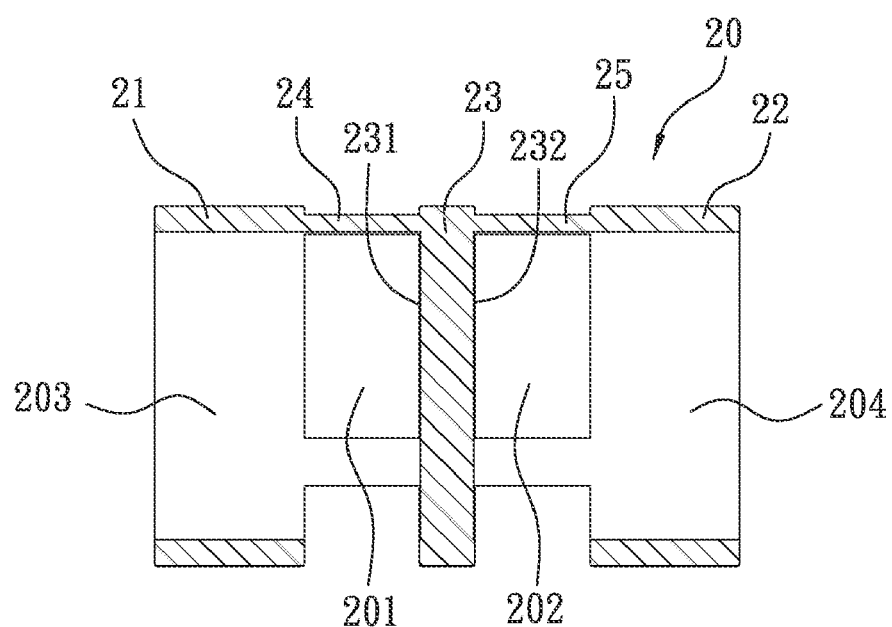
FIG. 10 is a cross sectional view showing the assembly of a valve core of the pressure balance valve according to the preferred embodiment of the present invention.
Figure 11:
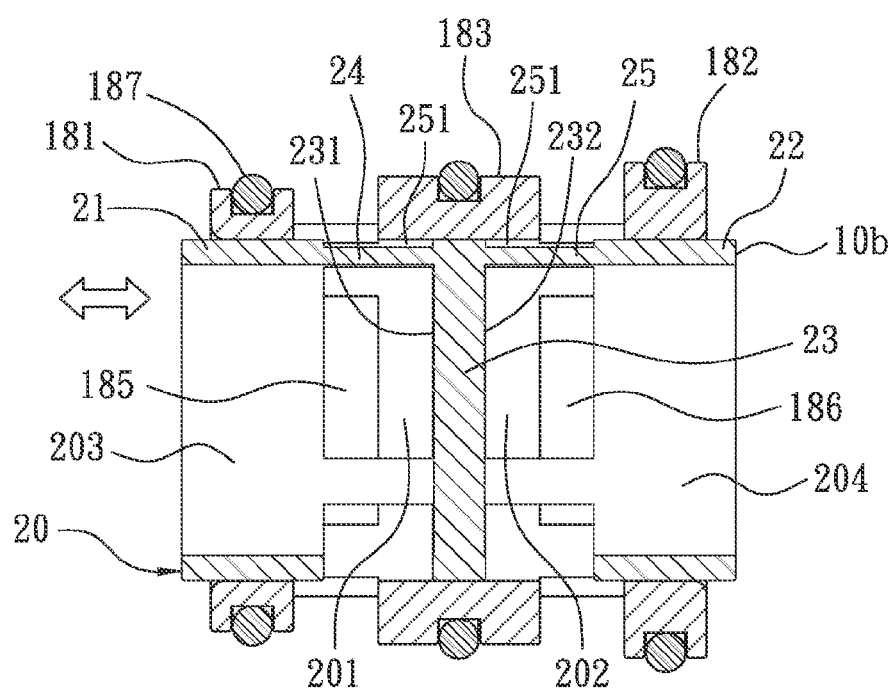
FIG. 11 is a cross sectional view showing the assembly of the sleeve member and the valve core according to the preferred embodiment of the present invention.

The plug element 10c, as illustrated in FIGS. 6, 8, and 9, is formed in a circular plug shape, and is fixed to the bore 17 of the body 10a so as to close the bore 17 and to form the second end wall 15 of the housing 10 and the second limiting element 151.

The plug element 10c includes an outer periphery 191 on which a second seal ring 192 is retained to engage with the bore 17, and includes an annular projection 193 radially extending therefrom to retain with the second stepped rim 171 of the bore 17.

The annular projection 193 of the plug element 10c includes a cutout 194 axially extending from a suitable position thereof, so that when assembling the plug element 10c, the cutout 194 is aligned to the stop tab 172 of the bore 17, and the stop tab 172 passes through the cutout 194 so that the plug element 10c is axially placed into the bore 17.

The plug element 10c includes a retaining groove 196 disposed on a connection of the annular projection 193 and an external side plane 195, and the external side plane 195 is formed in an centrally extending curved surface so that plug element 10c is axially placed into the bore 17, and after the stop tab 172 passes through the cutout 194, the plug element 10c is rotated appropriately so that the stop tab 172 is passed through the external side plane 195 to be rotated into the retaining groove 196, thus assembling the plug element 10c securely.

The external side plane 195 of the plug element 10c includes an elongated slot 197 fixed on a central portion thereof to rotate the plug element 10c after inserting a predetermined tool.

An internal side plane 198 of the plug element 10c includes a circular column member integrally extending from a center thereof to form the second limiting element 151, and includes an arcuate positioning block 199 axially extending therefrom to abut against the second fence 182 of the sleeve member 10b so that the sleeve member 10b is axially limited between the first stepped rim 162 of the body 10a and the positioning block 199 of the plug element 10c.

The sleeve member 10b is fitted to an intermediate segment of the inner surface 161 of the second peripheral wall 16 to define the first peripheral wall 13 of the housing 10, and the first outlet 13c and the second outlet 13d are placed onto the second peripheral wall 16 of the body 10a.

The valve core 20, as illustrated in FIGS. 4, 5, 10, and 11, is placed to the cavity 102 of the sleeve member 10c via the bore 17 of the body 10a and allows to slide along the cavity 102.

The valve core 20 includes a first loop 21, a second loop 22, and a pressure sensing cliff 23 between the first and the second loops 21, 22, between the first loop 21 and the pressure sensing cliff 23 are defined a plurality of first coupling reinforcements 24, and between the second loop 22 and the pressure sensing cliff 23 are defined a number of second coupling reinforcements 25 so that between any two abutting first coupling reinforcements 24 is defined a first pore 201 to flow the cold water, and between any two abutting second coupling reinforcements 25a is defined a second pore 202 to flow the hot water.

The first loop 21, the second loop 22, and the pressure sensing cliff 23 of the valve core 20 contact with the first fence 181, the second fence 182, and the middle fence 183 of the sleeve member 10c individually so that the valve core 20 is pushed to move along the cavity 102 axially.

The valve core 20 includes a cold-water pressure room 203 and a hot-water pressure room 204 spaced apart on two sides thereof by using the pressure sensing cliff 23, and the pressure sensing cliff 23 includes a first sensing membrane 231 to sense a water pressure in the cold-water pressure room 203 and a second sensing membrane 232 to sense a water pressure in the hot-water pressure room 204.

Diameters of outer surfaces of the first and the second coupling reinforcements 24, 25 of the valve core 20 are less than those of outer surfaces of the first, the second loops 21, 22, and the pressure sensing cliff 23 such that among the first, the second coupling reinforcements 24, 25, and the sleeve member 10c is defined a cut 251.

The first pore 201 of the valve core 20 is opposite to the second hole 185 of the sleeve member 10c so that the cold water from the second holes 185 flows into the cold-water pressure room 203 via the first pore 201, and after a partial cold water flows through the cut 251, it further flows into the cold-water pressure room 203 from the first pore 201. Likewise, the second pore 202 is opposite to the second orifices 186 of the sleeve member 10c so that the hot water from the second orifices 186 flows into the hot-water pressure room 204 via the second pore 202, and after a partial hot water flows through the cut 251, it further flows into the hot-water pressure room 204 from the second pore 202.

The first and the second limiting elements 141, 151 of the housing 10 are inserted to the first and the second loops 21, 22 of the valve core 20 so that between the first loop 21 and the first limiting element 141 is defined a first tunnel 205, and between the second loop 22 and the second limiting element 151 is defined a second tunnel 206, such that the cold water from the cold-water pressure room 203 flows out of the first outlet 13c via the first tunnel 205, and the hot water from the hot-water pressure room 204 flows out of the second outlet 13d through the second tunnel 206, wherein a cross sectional area of the first tunnel 205 to flow the cold water is less than that of the first inlet 13a, e.g., less than a cross sectional area of the first hole 131 to flow the cold water and a sum of cross sectional areas of the second holes 185 to flow the cold water. Also, a cross sectional area of the second tunnel 206 to flow the water is smaller than that of the second inlet 13b, e.g., smaller than a cross sectional area of the first orifice 132 to flow the hot water and a sum of cross sectional areas of the second orifices 186 to flow the hot water.

Figure 12:
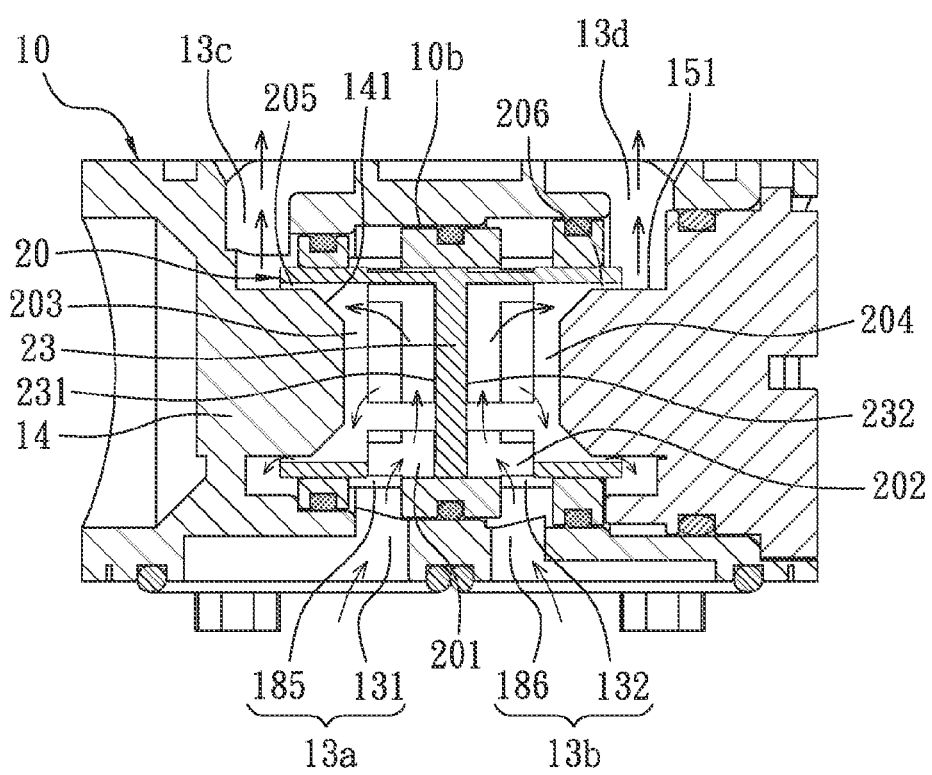
FIG. 12 is a cross sectional view showing the operation of the valve core according to the preferred embodiment of the present invention.

Referring to FIG. 12, the pressure balance valve 1 is applied the first and the second sensing membranes 231, 232 of the pressure sensing cliff 23 of the valve core 20 to sense the water pressure in the cold-water pressure room 203 and the water pressure in the hot-water pressure room 204, and when a difference between the cold-water and the hot-water pressure rooms 203, 204 is generated, the valve core 20 is influenced to slide axially along the sleeve member 10b so as to adjust flowing amount of the cold and the hot waters to eliminate a pressure difference, thereby balancing water pressure.

It is to be noted that two circular fourth openings on two ends of the valve core 20 are closed individually by the first and the second limiting elements 141, 151, so that a cross sectional area of the valve core 20 to flow the cold and the hot waters is decreased to remain the first and the second tunnels 205, 206, and cross sectional areas of the first and the second tunnels 205, 206 to flow the cold and the hot waters are controlled to be less than those of the first inlet 13a and the second inlet 13b, hence the cold water in the cold-water pressure room 203 and the hot water in the hot-water pressure room 204 are not released to flow outward quickly, such that an enough pressure is gathered to make the first sensing membrane 231 and the second sensing membrane 232 of the pressure sensing cliff 23 sense cold and hot water pressures, thus obtaining a pressure difference between the first and the second sensing membranes 231, 232 to be adjusted. Thereby, the temperature controlling valve to match with the pressure balance valve 1 is capable of controlling temperature within positive and negative 2 degrees Celsius.

Furthermore, the cross sectional areas of the first outlet 13c to flow the cold water and the second outlet 13d to flow the hot water are lowered to be less than those of the first inlet 13a and the second inlet 13b to balance the pressure, therefore the first and the second limiting elements 141, 151 are not required.

To prevent outflow amount of the prevent invention from not matching with a required standard, inflow amounts of the first inlet 13a and the second inlet 13b are increased to enhance the cross sectional areas of the first hole 131 and/or the second holes 185. Thereby, the cross sectional areas of the first outlet 13c to flow the cold water and the second outlet 13d to flow the hot water are larger than those of the first and the second tunnels 205, 206 to flow the water.

Pressure gathering effects of the cold-water pressure room 203 and the hot-water pressure room 204 are shown in FIG. 13, wherein inflow pressure of the cold and the hot waters are set under a condition of 45 Psi, and some parameters are set as follows:

A1 represents cross sectional areas of the first hole 131 to flow the cold water and the first orifice 132 to flow the hot water, and its area unit is $mm^2$ which is a fixed parameter;

A2 denotes sums of the cross sectional areas of the second holes 185 to flow the cold water and the second orifices 186 to flow the hot water, and its area unit is $mm^2$ which is a fixed parameter;

A3 means a cross sectional area of the fourth opening of the valve core 20 to flow water, and its area unit is $mm^2$ which is a fixed parameter;

A4 is a cross sectional area of the first outlet 13c to flow the cold water and the second outlet 13d to flow the hot water, and its area unit is $mm^2$ which is a variable parameter;

A1/A4 represents a ratio of the cross sectional areas of the first hole 131 to flow the cold water and the first outlet 13c to flow the cold water and also represents a ratio of the cross sectional areas of the first orifice 132 to flow the hot water and the second outlet 13d to flow the hot water, and this ratio is changed with a change of A4;

L denotes a sum of outflow amounts of the first outlet 13c to flow the cold water and the second outlet 13d to flow the hot water, and its flowing unit is GPM which changes with the change of A4;

P1 means a pressure sensed in the cold-water pressure room 203, and its pressure unit is Psi;

P2 means a pressure sensed in the hot-water pressure room 204, and its pressure unit is Psi.

From the FIG. 13, A4 is closed from 50.6 $mm^2$ to be lowered to 44.17 $mm^2$, 38.48 $mm^2$, 33.18 $mm^2$, and less than A1, but the pressure value of P1, P2 is fixed at 22 Psi, therefore when A4 is lowered, the gathered pressure does not change, but when A4 is further decreased to 28.27 $mm^2$ smaller than 35.66 $mm^2$ which is the cross sectional area of A1, the pressure values of P1 and P2 change obviously, e.g., they are increased from 22 Psi to 23 Psi so as to gather pressure. However, when A4 is lowered, the pressure values of P1 and P2 change greatly, while the flowing amount of L becomes decreased. To comply with a limitation of the flowing amount, the pressure to flow the cold and the hot waters are set to 45 Psi, and a basic flowing amount is more than 4.4 GPM.

The above tested data can be used to check a cross sectional area to flow water between A1 and A4 as shown in FIG. 14. For example, brands 1 and 2 are selected to check their pressure balance valves, wherein a cross sectional area of A2 of the pressure balance valve of the brand 1 is less than that of A1, and a cross sectional area of A4 is smaller than that of A3 so that a pressure gathering effect is checked from a ratio of the cross sectional areas of A2 and A4, and the ratio of the cross sectional areas of A2 and A4 is 1.1 less than 1.26 from the A1/A4 of FIG. 13. Therefore, such a ratio of the brand 1 is not helpful to enhance the pressure values of P1 and P2.

Also, the ratio of the cross sectional areas of A2/A4 of brand 2 is 1.02 less than that of brand 1, accordingly it is not helpful to enhance the pressure values of P1 and P2 as well.

While we have shown and described various embodiments in accordance with the present invention, it is clear to those skilled in the art that further embodiments may be made without departing from the scope of the present invention.

What is claimed is:

1. A pressure balance valve comprising
a housing including a first peripheral wall, a first end wall, and a second end wall to define an internal chamber; the first peripheral wall including an cylinder cavity defined therein to form most part of the internal chamber, and the cavity including two annular first openings arranged on two ends thereof respectively; the first peripheral wall including a first inlet to flow cold water and a second inlet to flow hot water, both of which are in communication with the cavity so that the cold and the hot waters from the first and the second inlets respectively flow into the cavity, and including a first outlet to flow the cold water and a second outlet to flow the hot water, both of which communicate with the cavity so that the cold and the hot waters from the cavity flow out of the first and the second outlets individually; the first and the second end walls including a first and a second limiting elements to limit flowing amount disposed on inner surfaces thereof respectively;
a valve core including a first loop, a second loop, and a pressure sensing cliff between the first and the second loops; the valve core including a cold-water pressure room defined between one side of the pressure sensing cliff and the first loop, and including a hot-water pressure room defined between another side of the pressure sensing cliff and the second loop; the valve core being slidably fitted to the cavity to slide axially; the valve core including at least one first pore to flow the cold water defined between the first loop and the pressure sensing cliff so as to communicate with the cold-water pressure room and the first inlet, and including at least one second pore to flow the hot water defined between the second loop and the pressure sensing cliff so as to communicate with the hot-water pressure room and the second inlet; the cavity including two annular first openings arranged on two ends thereof and defined by the first and the second loops respectively, and the first and the second limiting elements being placed in the first openings of the first and the second loops so that cross sectional areas of the first openings to flow the cold and the hot waters are decreased to be less than those of the first and the second inlets.

2. The pressure balance valve as claimed in claim 1, wherein cross sectional areas of the first and the second outlets are larger than those of the first openings which are decreased.

3. The pressure balance valve as claimed in claim 1, wherein the housing is comprised of a body, a sleeve member, and a plug element; the body includes the first end wall and the first limiting element formed therein, and further includes a second peripheral wall to form a part of the first peripheral wall and to communicate with a first hole to flow the cold water and a first orifice to flow the hot water so that the first hole is used to form a part of the first inlet and the first orifice serves to form a part of the second inlet, the first peripheral wall includes a bore disposed thereon relative to the first end wall; the sleeve member is placed into the second peripheral wall of the body through the bore, and includes a first fence and a second fence attached on two ends thereof individually, and includes a middle fence between the first and the second fences, an outer surface of the sleeve member and an inner surface of the second peripheral wall of the body engage with each other and define the first peripheral wall of the housing and the cavity together, between the first fence and the middle fence are defined a number of second holes to flow the cold water and to communicate with the first hole of the body and the first pore of the valve core, and between the second fence and the middle fence are defined a plurality of second orifices to flow the hot water and to communicate with the second holes of the body and the second pore of the valve core; the plug element is fixed to the bore of the body so as to form the second end wall of the housing and the second limiting element.

4. The pressure balance valve as claimed in claim 1, wherein the first and the second limiting elements are designed in an annular column shape to close two first openings on two ends of the valve core individually, such that between outer surfaces of the first and the second limiting elements and inners surfaces of the first openings of the valve core is defined a gap to flow the cold water from the cold-water pressure room and the hot water from the hot-water pressure room.

5. The pressure balance valve as claimed in claim 3, wherein cross sectional areas of the first openings of the valve core are small than those of the first hole and the first orifice and those of the second holes and the second orifices.

6. The pressure balance valve as claimed in claim 1, wherein a ratio of a smallest value between the cross sectional area of the first hole and a sum of the cross sectional areas of the second holes and the cross sectional area of the fourth opening of the valve core is at least more than 1.26; a ratio of a smallest value between the cross sectional area of the first orifice and a sum of the cross sectional areas of the second orifices and the cross sectional area of the fourth opening of the valve core is at least more than 1.26.

* * * * *